1,842,118

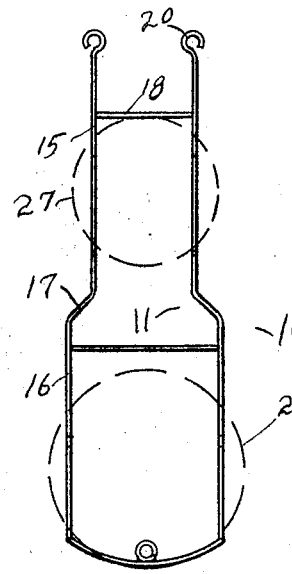
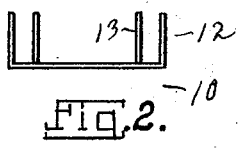
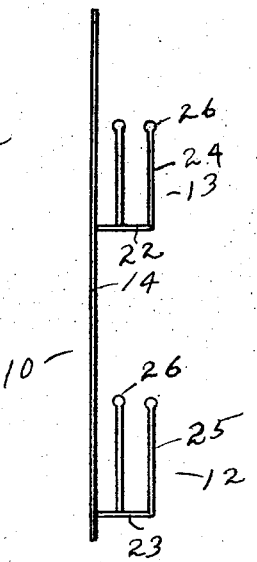
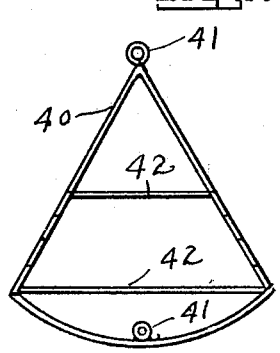
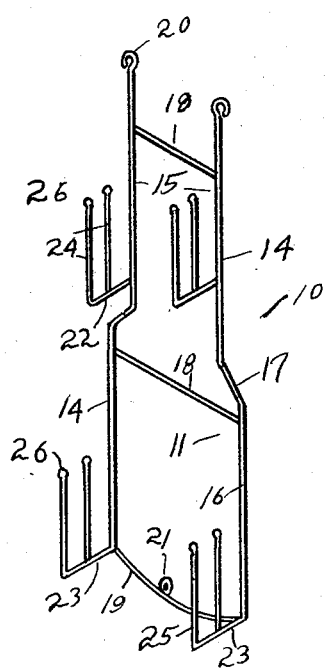
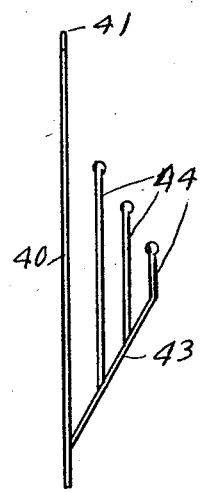
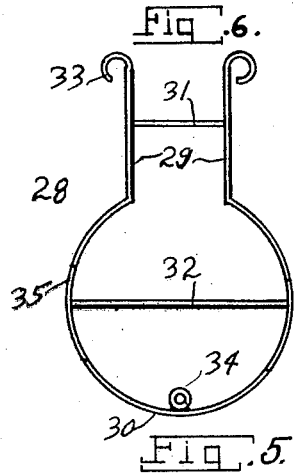
Inventor
Edward Resnik and Morris Resnik.
By Miller & Miller,
Attorneys Patented Jan. 19, 1932

UNITED STATES PATENT OFFICE

EDWARD RESNIK, OF BRONX, AND MORRIS RESNIK, OF NEW YORK, N. Y.

HOLDER FOR POT COVERS, DISHES, OR OTHER DISK LIKE OBJECTS

Application filed March 16, 1931. Serial No. 523,062.

This invention relates to a holder for pot covers or other disk like objects and has for an object to provide an improved space saving device for these objects.

A further object of this invention is to provide a pot cover holder that may be easily secured to a vertical surface such as a wall adjacent a kitchen stove, whereby the housewife may have a plurality of pot covers easily available for use in preparing a meal.

A further object of this invention is to provide a pot cover holder for holding covers of various sizes.

Yet another object of this invention is to provide a pot cover holder that may be made entirely of wire and hence may be inexpensively manufactured and sold.

With the foregoing and other objects in view, as will hereinafter become apparent, this invention comprises the constructions, combinations and arrangements of parts, hereinafter disclosed, claimed and shown on the accompanying drawings. In these drawings, Figure 1 is a front plan view of the holder constituting this invention, showing in outline two sizes of pot covers or other disk like objects retained thereon.

Figure 2 is a bottom plan of Figure 1.

Figure 3 is a side plan of Figure 1.

Figure 4 is a perspective view of Figure 1.

Figure 5 is a front view of a modified form of this invention.

Figure 6 is a front plan view of another modified form of this invention, and

Figure 7 is a side view of Figure 6.

There is shown at 10 the preferred form of this invention and comprises a framework 11 and disk or cover holding means 12 and 13. The framework 11 is formed of two upwardly projecting wires 14, the upper and lower ends of the wires each being parallel as shown at 15 and 16, and the upper ends 15 being connected to the lower ends 16 by a diverging portion 17. The wires 14 are connected by a plurality of cross wires 18 and 19 and to facilitate the attachment of the framework 11 to a vertical surface such as a kitchen wall, the extremities of the wires 14 are formed into eyelets 20 and another eyelet 21 is attached to the cross wire 19. Projecting forwardly from the upper portions 15 and lower portions 16 are a pair of parallel arms 22 and 23. Each arm 22 and 23 has one or more upwardly projecting parallel fingers 24 and 25 and the extremities of the fingers may be beaded as at 26.

In operation, the holder may be secured to a wall by means of nails, hooks or the like, through the eyelets 20 and 21, then disk like objects such as pot covers, plates or the like, as shown in dashed outline at 27 may be placed on 22 or 23 and are retained in position between the fingers 24 and 25, and against the framework 11.

In Figure 5 there is shown a framework 28 and this framework 28 may comprise a single base of wire having parallel ends 29 spaced about and connected by a substantially circular portion 30, and having cross wires 31 and 32 to strengthen the framework 28. Eyelets 33 formed on the extremity of the wire and 34 placed on the bottom of the framework, facilitate its attachment to a wall. A pair of forwardly upwardly projecting arms 35 serve as a means for retaining a pot cover or other disk like object thereon.

In the modification shown in Figures 6 and 7, a framework 40 is formed of a substantially triangular piece of wire having eyelets 41 attached thereto for facilitating its attachment to a wall. A pair of cross wires 42 serve to strengthen a framework 40. Attached adjacent the base of this triangular framework are a pair of upwardly forwardly projecting arms 43 and rising from these arms 43 are a plurality of pairs of fingers 44. Inasmuch as these arms 43 converge toward each other, it will be observed that each upper pair of fingers 44 are more closely spaced than the next lower pair, whereby smaller pot covers may be retained between the upper fingers than between the lower fingers.

Having thus set forth and disclosed the nature of this invention, what is claimed is:

1. A wall supported retaining device for pot covers or other disk like objects comprising a plurality of upwardly projecting wires, eyelets formed on the upper ends of said wires, cross wires attaching said upwardly projecting wires, one end of said upwardly projecting wires being spaced further apart than the other ends thereof, pairs of forwardly projecting arms adjacent each end of the upwardly projecting wires, pairs of upwardly projecting fingers on said forwardly projecting arms, said upwardly projecting fingers being adapted to retain disk like objects on said forwardly projecting arms, the forwardly projecting arms on the narrow end of the framework being adapted to receive smaller disk like objects than the arms on the other end of said frame.

2. A cover pot holder comprising two upwardly projecting wires, the upper ends of said wires being parallel, the middle portion of said wires diverging and the lower portion being again parallel, cross wires securing said upwardly projecting wires together and forming a framework therewith, a pair of forwardly projecting wires on each of said upper and lower portions of the framework wires, and one or more upwardly projecting fingers on each of said forwardly projecting wires.

3. A cover pot holder comprising two upwardly projecting wires, the upper ends of said wires being parallel, the middle portion of said wires diverging and the lower portion being again parallel, cross wires securing said upwardly projecting wires together and forming a framework therewith, a pair of forwardly projecting wires on each of said upper and lower portions of the framework wires, and one or more upwardly projecting fingers on each of said forwardly projecting wires, eyelets formed on the upper ends of the upwardly projecting framework wire and on one of said cross wires, whereby to facilitate attachment of said cover pot holder to a vertical surface.

In testimony whereof we affix our signatures.

EDWARD RESNIK.
MORRIS RESNIK.